United States Patent

[11] 3,624,139

[72] Inventors Pauls Davis
Gibraltar;
Herwart C. Vogt, Grosse Ile, both of Mich.
[21] Appl. No. 788,644
[22] Filed Jan. 2, 1969
[45] Patented Nov. 30, 1971
[73] Assignee BASF Wyandotte Corporation
Wyandotte, Mich.
Continuation-in-part of application Ser. No. 535,049, Mar. 17, 1966, now abandoned. This application Jan. 2, 1969, Ser. No. 788,644

[54] ACRYLIC ACID ESTERS
5 Claims, No Drawings

[52] U.S. Cl. .................................................. 260/486 H,
106/253, 117/136, 260/37 R, 260/89.5, 260/480 B
[51] Int. Cl. ...................................................... C01c 69/54
[50] Field of Search .......................................... 260/486 H,
486 B

[56] References Cited
UNITED STATES PATENTS

| | | | |
|---|---|---|---|
| 2,962,524 | 11/1960 | Hostettler et al. ............ | 260/484 |
| 2,567,842 | 9/1951 | Erickson ...................... | 260/486 X |
| 3,244,754 | 4/1966 | Bruson et al. ................. | 260/615 |

FOREIGN PATENTS

| | | | |
|---|---|---|---|
| 1,095,900 | 12/1967 | Great Britain ............... | 260/486 |

*Primary Examiner*—Lorraine A. Weinberger
*Assistant Examiner*—Paul J. Killos
*Attorneys*—Bernhard R. Swick, Cedric H. Kuhn, Robert E. Dunn, Joseph D. Michaels and Charles G. Lamb

ABSTRACT: A halogen containing ester composition of matter, and process for preparing same, having a structure depicted by the following formula:

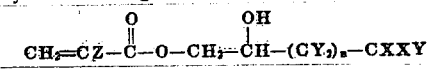

wherein Z is selected from the group consisting of hydrogen and methyl group, Y is selected from the group consisting of hydrogen and halogen having an atomic weight of 19 to 80, inclusive, X is halogen having an atomic weight of 19 to 80, inclusive, and $n$ is selected from 0 and 1.

ACRYLIC ACID ESTERS

This application is a continuation-in-part of copending U.S Pat. application Ser. No. 535,049, filed March 17, 1966, 1966, now abandoned.

Processes for the preparation of acrylate esters by reacting acrylic acid or methacrylic acid with an alkylene oxide in the presence of an alkali or alkaline earth metal salt catalyst are known in the prior art. The commercial potentialities in industrial uses of such esters are well recognized. However, while these materials are well suited for many purposes, in general, the prior art acrylate esters have a major disadvantage and, consequently, a factor which limits the area of their potential use in that they are flammable and burn readily.

Thus as imposed by insurance underwriters and civic ordinances, dictate that materials more resistant to fire be used for many applications.

Accordingly, it is a purpose of this invention to provide a process for preparing a class of acrylic acid esters which are characterized by excellent physical properties whereby they are useful for the many purposes for which acrylates are known, which are also useful as intermediates for the production of other esters, and which are useful in the preparation of compositions which have a relatively high order of nonflammability, which, in many cases, are nonburning and which compositions may be polymerized and cross-linked to provide new and useful plastic-type products.

It has now been found that the foregoing and additional purposes are accomplished by reacting in the presence of a boron trifluoride catalyst.

1. a vicinal alkylene oxide containing from three to four carbon atoms, inclusive, and having an alkyl group attached to a carbon atom of the oxirane ring, said alkyl group having up to two carbon atoms and containing at least two halogen atoms, each halogen atom having an atomic weight of 19 to 80, inclusive, and
2. an acid selected from the group consisting of acrylic acid and methacrylic acid.

Since boron trifluoride is a gas at the normal reaction temperatures employed, it is desirable to add the boron trifluoride in the form of a compound or complex of boron trifluoride which is liquid at the reaction temperature. Accordingly, the term "boron trifluoride", as used herein, includes boron trifluoride and compounds and complexes of boron trifluoride which facilitate the use of boron trifluoride in their reaction. Ether compounds and complexes of boron trifluoride are preferred. These materials are disclosed and discussed in *Boron Trifluoride and its Derivatives* by Harold Simmons Booth and Donald Ray Martin, pages 68–71, John Wylie and Sons, Inc., New York, 1949. In general, compounds and complexes of the lower ethers are preferred since these provide higher percentages of $BF_3$ in the compound or complex. Particularly preferred are the boron trifluoride compounds or complexes of dimethyl ether, diethyl ether, methyl ethyl ether and tetrahydrofuran. A suitable product, which is readily available, is the well-known commercial product known as boron trifluoride etherate which is primarily the boron trifluoride complex of diethyl ether.

Only small amounts of the catalyst are needed to effect a substantially complete reaction in a short time. Satisfactory results are ordinarily obtained with catalyst concentrations of from a few tenths of 1 percent to 1 percent or more based on the total weight of the reactants. If desired, more or less than this amount may be used even up to a relatively uneconomic 10 percent by weight of reactants. Thus, the catalyst can be employed in a range from about 0.01 percent to 10 percent by weight but preferably from about 0.1 percent to 0.5 percent by weight of the total reaction mixture.

The preferred products of this invention may, in general, be depicted by the formula:

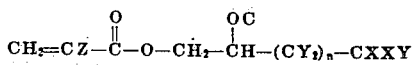

wherein Z is selected from the group consisting of hydrogen and a methyl group, Y is selected from the group consisting of hydrogen and halogen having an atomic weight of 19 to 80, inclusive, X is halogen having an atomic weight of 19 to 80, inclusive, and $n$ is selected from 0 and 1.

The products of this invention are particularly useful as monomers to prepare nonburning, clear plastics by vinyl-type polymerization. They can also be cross-linked with unsaturated monomers to give hard plastics which have properties comparable or superior to those of commercially available polyester plastics. These products are also useful as intermediates for carbonate esters prepared by reactions with phosgene which products, in turn, are useful for preparing nonburning, thermosetting clear plastics. In using the product of this invention, it is often necessary to subject it to reaction with or in the presence of an alkali metal hydroxide or alkoxide. U.S. Pat. No. 2,567,842 to Erickson discloses a similar compound represented by the general formula

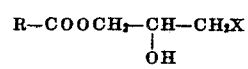

where R represents a monovalent hydrocarbon radical and X represents a halogen selected from the class consisting of chlorine and bromine.

Illustrative examples of monovalent hydrocarbon radicals which R in the above formula may represent include the vinyl radical, thus in effect disclosing compounds having the formula:

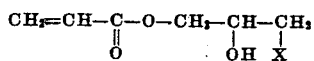

Where the general formula depicting the preferred products of this invention, Z is hydrogen and $n$ is O the products are defined by the following formula:

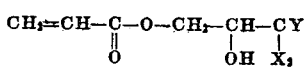

Thus the products of this invention in many instances differ from the compounds disclosed by Erickson in that the terminal carbon atom must contain at least two halogen atoms instead of one. It is taught and disclosed in the Erickson patent that when Erickson's compound having the single terminal halogen is treated with an alkali metal hydroxide or alkoxide the product is dehydrohalogenated wherein the halogen is removed and an epoxide group is formed, thus, as set forth in column 2, lines 54–58, of Erickson, "... yielding a glycidyl ester which may be represented by the general formula

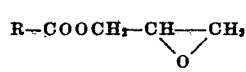

...."

Where R is vinyl the formula is:

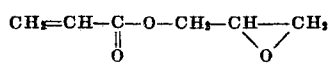

Thus reaction of Erickson's compound with or in the presence of alkali metal hydroxide eliminates the halogen from the compound and also the nonflammable properties attributable to the presence of halogen.

Since the products of this invention may differ from that of Erickson only in the number of halogens substituted on the terminal carbon atom, one skilled in the art would expect that the presence of alkali metal hydroxide would dehydrohalogenate the products of this invention, thus removing the halogens to produce the epoxide set forth above and, in any event, at least remove one of the terminal halogen atoms. However, it has been surprisingly discovered that the products of this invention when subjected to treatment with an alkali metal hydroxide or in the presence of same is not dehydrohalogenated but the terminal portion of the compound retains its original structure and remains unaffected. Thus, in the presence of alkali metal hydroxide or alkoxide, the products of this invention do not lose any terminal halogen atoms and thus the effectiveness of the instant product with respect to its nonflammable properties is unaffected by the presence of alkali metal hydroxide whereas the product disclosed in Erickson has its halogens completely removed thus losing whatever effectiveness it may have possessed with respect to nonflammability.

Representative polyhalogenous alkylene oxides used to prepare the polyesters of the present invention are 1,1-dichloro-2,3-epoxypropane, 1,1,1-trichloro-2,3-epoxypropane, 1,1,1,-trifluoro-2,3-epoxypropane, 1-bromo-1,1-dichloro-2,3-epoxypropane, other mixed 1,1,1-trihalo-2,3-epoxypropanes, 1,1,1-trichloro-3,4-epoxybutane, 1,1-difluoro-1-chloro-2,3-epoxypropane, 1,1-dichloro-1-fluoro-2,3-epoxypropane, 1,1,1-tribromo-3,4-epoxybutane, 1,2-dibromo-3,4-epoxybutane, 1,1,1,2,2-pentachloro-3,4-epoxybutane, 1,1,1,2,2-pentafluoro-3,4-epoxybutane, 1,1,1,2,2-mixed pentahalo-3,4epoxybutanes, et cetera. Preferably, all of the valences of the terminal carbon atom of the alkyl group are satisfied by halogen atoms, or alternatively the halogen atoms present are preferably present on the terminal carbon atom of the alkyl group.

Any halogen or combination of halogens may be present in the starting polyhalogenous alkylene oxide. Of the halogens, chlorine, fluorine and bromine are preferred and the preferred halogens therefore have an atomic weight of 19 to 80, inclusive. In general, the higher the halogen content incorporated into the polyester, the better the overall fire resistance and chemical resistance of the polyester products. For this reason, starting alkylene oxides containing more than two halogen atoms on the alkyl substituent of the oxirane ring are preferred over the corresponding alkylene oxides containing only two halogen atoms. By way of example, 3,3,3-trichloropropylene oxide, which contains three halogen atoms on the polyhalogenoalkyl group, is preferred over the corresponding dihalogenoalkylene oxide, 3,3-dichloropropylene oxide.

In the formation of the esters in accordance with the present invention, it is possible to vary the proportion of reactants over a wide range. That is, both of the reactants can be used in stoichiometrically equivalent amounts or either can be used in large excess. Ordinarily, molar ratios of polyhalogenous alkylene oxide to the acrylic acid or methacrylic acid of about 1:1 to about 3:1 are preferred, although, if desired, ratios as high as 6:1 or even higher may be successfully employed. Also, ratios as low as 1:2 may be employed.

The esters are generally formed by heating and reacting the polyhalogenous alkylene oxide with the acrylic or methacrylic acid in the presence of the catalyst at a preferred temperature of at least about 20° C. Higher temperatures may be employed although temperatures in excess of about 100° C. generally provide little or no additional advantages. A solventless system may be employed in conducting the reaction or a solvent may be employed. When it is desired to use a solvent, nonaqueous or substantially nonaqueous organic solvents and solvents which are unreactive with the reactants and products of the reaction are preferred. These include hydrocarbons such as benzene, toluene, hexane, et cetera; and halohydrocarbons such as halobenzenes, e.g., chlorobenzene, halotoluenes, aliphatic halohydrocarbons such as high-boiling polyhalomethanes, et cetera. With low-boiling solvents it may be necessary to conduct the reaction under greater than atmospheric pressure, but normally atmospheric pressure is preferred since the use of increased pressure, although operative, sometimes makes control of the exothermic heat of reaction difficult. The reaction may be advantageously conducted under an inert atmosphere, as of nitrogen or carbon dioxide. The use of such an inert atmosphere usually improves the overall color of the product.

Any of several different general procedures may be used in carrying out the reaction between the starting polyhalogenous alkylene oxide and dicarboxy compound. The oxide, acrylic or methacrylic acid and reaction catalyst can all be mixed at once and the reaction mixture heated to the desired temperature range. The reaction between the alkylene oxide and acrylic or methacrylic acid is exothermic at reaction temperatures so that considerable heat may evolve and maintain the desired temperature for a period without additional external heating, and may even require external cooling. It is possible to take advantage of the exothermic heat of reaction by adding one or more of the reactants to the reaction mixture portionwise at such a rate that the desired reaction temperature is maintained.

The time necessary to react that polyhalogenous alkylene oxide and the acrylic acid or methacrylic acid can vary between 60 minutes and 6 hours, depending upon the specific reactants, temperature, etc., employed. The reaction is considered complete when there are no volatiles left in the reaction mixture or when the amount of volatiles in the reaction mixture levels off to a constant minimum.

As stated above, the product as produced in accordance with the present invention may be beneficially used for a variety of purposes, including most applications where commercial polyesters are currently being used, but giving products with superior fire and chemical resistance. They range from liquids to rubbery elastomers to hard, strong plastics. These products can be used for variety of purposes in such diversified fields as adhesives, coatings, and the like. They can be polymerized and cross-linked with various ethylenically unsaturated cross-linking agents to yield materials useful in a wide variety of applications including flexible and rigid coatings, elastomers, rubbers, soft-to-hard plastics, etc., all having a high degree of nonflammability and chemical resistance and, in many cases, even being nonburning. Physical properties of these ester materials may be upgraded by the addition, according to well-known procedures, of some auxiliary, natural or synthetic materials such as glass fibers, asbestos, sisal, cotton, nylon (polyamide and polyester), wood and pigment fillers, etc., to give reinforced plastics and laminates of superior strength and nd a high degree of nonflammability. In addition, these esters, particularly when polymerized to form polyesters, may be mixed with certain drying oils such as linseed oil and perilla oil and coated on a surface to undergo oxidative nonlinking or polymerization to give tough, elastic, weather and chemical resistant air-drying films which have improved fire resistance. Additional uses and modifications of the stated uses will be readily apparent to one skilled in the art.

An ester prepared from 3,3,3-trichloropropylene oxide and either acrylic acid or methacrylic acid in a molar ratio of about 1:1 to about 1.5:1 in the presence of a boron trifluoride catalyst is of particular interest and value and therefore represents a preferred embodiment of the invention.

The practice of this invention will be more completely understood by reference to the following examples.

EXAMPLES 1–21

A series of esters is prepared by charging polyhalogenous alkylene oxide, acrylic or methacrylic acid, and methylene chloride solvent in the amounts shown in the table below, along with 1 gram of 4-tertiary butyl catechol inhibitor to a 3-liter, round-bottom flask equipped with a mechanical stirrer and thermometer. In examples 1–5 and 10–21, the catalyst is boron trifluoride ethyl ether which is gradually added from a dropping funnel, whereas in examples 6–9 the catalyst is boron trifluoride gas which is bubbled through the material in the flask. The total amount of catalyst is the amount shown in the table below. The reaction temperature is maintained below the maximum shown in the table, first, by controlling the rate of addition of the catalyst and, later, by cooling with water, i.e., running water around the outside of the flask. After completion of the reaction, the catalyst is removed from the crude mixture by treatment, according to the method described below, with sodium carbonate, calcium chloride and sodium bicarbonate as indicated in the table.

More specifically, in the sodium bicarbonate treatment the crude material is treated with 10 percent sodium bicarbonate solution to neutralize the acid, followed by a water wash and drying over a mixture of sodium sulfate and magnesium sulfate and filtering using a Buchner funnel.

In the sodium carbonate treatment the crude material is washed with 25 percent sodium carbonate plus 1 percent aqueous sodium hydroxide solution, followed by a water wash, extraction with methylene chloride, drying over sodium sulfate and magnesium sulfate mixture, and filtering.

In the calcium chloride treatment the crude material is treated with 50 percent aqueous calcium chloride solution, followed by neutralization with sodium bicarbonate, drying over a sodium sulfate/magnesium sulfate mixture, and filtering in a Buchner funnel.

After catalyst removal, the desired ester product is isolated from the crude reaction mixture by flash distillation.

Percentage conversions in the range of 50 to 65 percent, based on the amount of methacrylic or acrylic acid initially employed, are obtained.

oil containing 41.8 percent chlorine. From this it can be seen that treatment with sodium hydroxide did not remove any terminal chlorine atoms. The molecular weight was 259.

Fifty grams of the above product was mixed with 0.5 gram granular benzoyl peroxide (1 percent by weight of the monomer) until a homogeneous solution was obtained. The mixture was poured in a mold and heated at 80° C. for 18 hours. A clear hard plastic was obtained which was self-extinguishing.

EXAMPLE 24

12.8 grams (0.05 mole) of the product from example 6 and 4.0 grams (0.1 mole) sodium hydroxide in 200 ml. of water was vigorously stirred for 40 minutes at 5° C. The product was extracted with 100 ml. methylene chloride, washed, dried over $MgSO_4$ and stripped to give 12 grams of a light straw-yellow oil containing 40.9 percent chlorine by weight. From this it can be seen that treatment with sodium hydroxide did not remove any terminal chlorine atoms. The molecular weight was 250.

Ten grams of the above product was mixed with 0.1 gram granular benzoyl peroxide (1 percent by weight of the monomer) until a homogeneous solution was obtained. The mixture was poured in a mold and heated at 80° C. for 18 hours. A clear, hard plastic was obtained which was self-extinguishing.

TABLE

| Example No. | Alkylene oxide Kind | Grams | Acid Kind | Grams | Alkylene oxide: acid mol ratio | Catalyst, grams | Grams of solvent | Max. reaction temp., °C. | Reaction time, minutes | Catalyst removal treatment |
|---|---|---|---|---|---|---|---|---|---|---|
| 1 | 3,3,3-trichloropropylene oxide | 1,130.5 | Methacrylic | 602 | 1:1 | 94 | 1,315 | 40 | 240 | Na₂CO₃ |
| 2 | do | 323 | do | 172 | 1:1 | 11.8 | 376 | 40 | 160 | CaCl₂ |
| 3 | do | 243 | Acrylic | 72.1 | 1.5:1 | 28.3 | 280 | 100 | 120 | Na₂CO₃ |
| 4 | do | 323 | do | 144 | 1:1 | 37.3 | 376 | 100 | 160 | Na₂CO₃ |
| 5 | do | 323 | Methacrylic | 172 | 1:1 | 20.0 | 376 | 110 | 180 | NaHCO₃ |
| 6 | do | 81 | do | 43 | 1:1 | 1.2 | 94 | 30 | 65 | Na₂CO₃ |
| 7 | do | 243 | do | 129 | 1:1 | 3.76 | 280 | 30 | 95 | Na₂CO₃ |
| 8 | do | 323 | do | 172 | 1:1 | 4.0 | 376 | 30 | 110 | Na₂CO₃ |
| 9 | do | 484.5 | do | 172 | 1.5:1 | | 565 | 100 | 160 | Na₂CO₃ |
| 10 | do | 484.5 | do | 172 | 1.5:1 | 31.0 | 565 | 100 | 100 | Na₂CO₃ |
| 11 | do | 484.5 | do | 172 | 1.5:1 | 31.0 | 565 | 100 | 175 | Na₂CO₃ |
| 12 | do | 484.5 | do | 172 | 1.5:1 | 31.0 | 565 | 100 | 160 | Na₂CO₃ |
| 13 | 1,1-dichloro-2,3-epoxypropane | 190.5 | do | 86 | 1.5:1 | 12 | 280 | 100 | 125 | Na₂CO₃ |
| 14 | 1,1,1-trifluoro-2,3-epoxypropane | 168 | do | 86 | 1.5:1 | 11.7 | 280 | 100 | 135 | Na₂CO₃ |
| 15 | 1-bromo-1,1-dichloro-2,3-epoxypropane | 309 | do | 86 | 1.5:1 | 19.8 | 280 | 100 | 150 | Na₂CO₃ |
| 16 | 1,1,1-trichloro-3,4-epoxybutane | 264 | do | 86 | 1.5:1 | 16.9 | 280 | 100 | 160 | Na₂CO₃ |
| 17 | 1,1-difluoro-1-chloro-2,3-epoxypropane | 193 | do | 86 | 1.5:1 | 12.2 | 280 | 100 | 150 | Na₂CO₃ |
| 18 | 1,1-dichloro-1-fluoro-2,3-epoxypropane | 217 | do | 86 | 1.5:1 | 12.6 | 280 | 100 | 135 | Na₂CO₃ |
| 19 | 1,1,1-tribromo-3,4-epoxybutane | 464 | do | 86 | 1.5:1 | 27 | 280 | 100 | 140 | Na₂CO₃ |
| 20 | 1,2-dibromo-3,4-epoxybutane | 345 | do | 86 | 1.5:1 | 20 | 280 | 100 | 150 | Na₂CO₃ |
| 21 | 1,1,1,2,2-pentachloro-3,4-epoxybutane | 367 | do | 86 | 1.5:1 | 21.3 | 280 | 100 | 125 | Na₂CO₃ |

EXAMPLE 22

23.3 grams (0.1 mole) of the product of example 4 was vigorously stirred for 1½ hours with 4.0 grams (0.1 mole) sodium hydroxide dissolved in 350 ml. of water at 10° C. in a 500-ml. flask. The product was then extracted with methylene chloride, washed, dried over $MgSO_4$ and stripped giving 22.9 grams of a light straw-yellow oil containing 45.1 percent by weight chlorine. From this it can be seen that treatment with sodium hydroxide did not remove any terminal chlorine atoms. The molecular weight was 228.

Twenty grams of the above product was mixed with 0.2 gram granular benzoyl peroxide (1 percent by weight of the monomer) until a homogeneous solution was obtained. The mixture was poured in a mold and heated at 80° C. for 18 hours. A clear, hard plastic was obtained which was self-extinguishing.

EXAMPLE 23

50.4 grams (0.2 mole) of the material prepared in example 1 in 500 ml. of water containing 5.6 grams (0.1 mole) potassium hydroxide was vigorously stirred for 60 minutes at 10–15° C. The reaction product was isolated by extracting with 200 ml. chloroform, the extract washed with water, dried over $MgSO_4$ and stripped to give 50.0 grams of a light straw-yellow Conventional products may be prepared from the above plastics such as casting resins for models, patterns, molds, tools, insulation, encapsulation and potting. Coatings with such resins is also an important field of application. Conventional techniques such as compression molding, hand lay-up, casting and high-pressure laminating may be employed in the preparation of these and other useful products.

It is to be understood that various changes and modifications may be made in the foregoing composition and the process without departing from the spirit of the invention and scope of the appended claims.

What is claimed is:

1. An ester having the following formula:

wherein Z is selected from the group consisting of hydrogen and methyl group, Y is selected from the group consisting of hydrogen and halogen having an atomic weight of 19 to 80, inclusive, X is halogen having an atomic weight of 19 to 80, inclusive, and n is selected from zero and one.

2. The ester of claim 1 is wherein Z is hydrogen.
3. The ester of claim 1 wherein Z is a methyl group.
4. The ester of claim 1 wherein n is zero.
5. The ester of claim 4 wherein Y is a halogen.

* * * * *